(12) United States Patent
Kitajima et al.

(10) Patent No.: US 6,933,852 B2
(45) Date of Patent: Aug. 23, 2005

(54) OPTICAL SWITCHING APPARATUS AND OPTICAL COMMUNICATION NETWORK SYSTEM

(75) Inventors: Shigeki Kitajima, Kawasaki (JP); Sunao Kakizaki, Kawasaki (JP); Hideaki Tsushima, Komae (JP); Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 10/093,829

(22) Filed: Mar. 11, 2002

(65) Prior Publication Data

US 2003/0128979 A1 Jul. 10, 2003

(30) Foreign Application Priority Data

Jan. 15, 2002 (JP) ......................................... 2002-006481

(51) Int. Cl.⁷ .............................................. G08B 21/00
(52) U.S. Cl. ............................ 340/635; 398/12; 385/16
(58) Field of Search ........................... 340/635; 398/15, 398/17, 12; 385/16, 17

(56) References Cited

U.S. PATENT DOCUMENTS 5,491,572 A * 2/1996 Ohara .......................... 398/15
6,483,625 B2 * 11/2002 Shimura et al. ............... 398/95
6,731,832 B2 * 5/2004 Alvarez et al. ................ 385/16
6,778,725 B1 * 8/2004 Kakizaki et al. .............. 385/16
6,839,480 B2 * 1/2005 Kakizaki et al. .............. 385/16

FOREIGN PATENT DOCUMENTS

JP 6-311112 11/1994
JP 6-350542 12/1994

* cited by examiner

Primary Examiner—John Tweel, Jr.
(74) Attorney, Agent, or Firm—McDermott Will & Emery LLP

(57) ABSTRACT

An optical communication network system is disclosed, which includes an optical switching apparatus. The optical switching apparatus includes an optical switch for switching and setting routes of an optical signal without being converted, a control unit for instructing the optical switch to execute a route switching operation, and a performance monitor for detecting performance of the optical signal having a route set by the optical switch. The performance monitor issues an alarm when the performance detected is deteriorated from predetermined performance. The control unit includes an alarm masking unit for masking the alarm issued from the performance monitor at least for a predetermined masking period from a starting time of a switching operation by the optical switch, and thus preventing the alarm from being issued.

12 Claims, 17 Drawing Sheets

FIG.8

ALARM REGISTER AND MASK REGISTER (STATE 1)

| PORT | KIND OF ALARM | ALARM REGISTER 352 | MASK REGISTER 353 | ALARM AFTER MASKING |
|---|---|---|---|---|
| PORT 1 | POWER FAILURE ALARM | NORMAL: 0 | MASK RELEASING: 1 | NORMAL: 0 |
| | ERROR RATE ALARM | NORMAL: 0 | MASK RELEASING: 1 | NORMAL: 0 |
| | OPERATION CLOCK STEPPING-OUT ALARM | NORMAL: 0 | MASK RELEASING: 1 | NORMAL: 0 |
| | FRAME STEPPING-OUT ALARM | NORMAL: 0 | MASK RELEASING: 1 | NORMAL: 0 |
| ... | ... | ... | ... | ... |
| PORT N | POWER FAILURE ALARM | NORMAL: 0 | MASK RELEASING: 1 | NORMAL: 0 |
| | ERROR RATE ALARM | NORMAL: 0 | MASK RELEASING: 1 | NORMAL: 0 |
| | OPERATION CLOCK STEPPING-OUT ALARM | NORMAL: 0 | MASK RELEASING: 1 | NORMAL: 0 |
| | FRAME STEPPING-OUT ALARM | NORMAL: 0 | MASK RELEASING: 1 | NORMAL: 0 |

FIG.9

| | POWER FAILURE ALARM | | ERROR RATE ALARM | | OPERATION CLOCK STEPPING-OUT ALARM | | FRAME STEPPING-OUT ALARM | |
|---|---|---|---|---|---|---|---|---|
| | MASKING PERIOD | OUTPUT AFTER MASKING | MASKING PERIOD | OUTPUT AFTER MASKING | MASKING PERIOD | OUTPUT AFTER MASKING | MASKING PERIOD | OUTPUT AFTER MASKING |
| PORT 1 | 10ms | NORMAL: 0 | 15s | NORMAL: 0 | 10ms | NORMAL: 0 | 10ms | NORMAL: 0 |
| PORT 2 | 10ms | NORMAL: 0 | 15s | NORMAL: 0 | 10ms | NORMAL: 0 | 10ms | NORMAL: 0 |
| ... | ... | ... | ... | ... | ... | ... | ... | ... |
| PORT N | 10ms | NORMAL: 0 | 15s | NORMAL: 0 | 10ms | NORMAL: 0 | 10ms | NORMAL: 0 |

FIG.10

| | STATE | KIND OF ALARM | ALARM REGISTER 352 | MASK REGISTER 353 | ALARM AFTER MASKING |
|---|---|---|---|---|---|
| 611 | STATE 1 | POWER FAILURE ALARM | NORMAL: 0 | MASK RELEASING: 1 | NORMAL: 0 |
| | | ERROR RATE ALARM | NORMAL: 0 | MASK RELEASING: 1 | NORMAL: 0 |
| 612 | STATE 2 | POWER FAILURE ALARM | NORMAL: 0 | MASKING: 0 | NORMAL: 0 |
| | | ERROR RATE ALARM | NORMAL: 0 | MASKING: 0 | NORMAL: 0 |
| 613 | STATE 3 | POWER FAILURE ALARM | ABNORMAL: 1 | MASKING: 0 | NORMAL: 0 |
| | | ERROR RATE ALARM | ABNORMAL: 1 | MASKING: 0 | NORMAL: 0 |
| 614 | STATE 4 | POWER FAILURE ALARM | NORMAL: 0 | MASK RELEASING: 1 | NORMAL: 0 |
| | | ERROR RATE ALARM | ABNORMAL: 1 | MASKING: 0 | NORMAL: 0 |
| 615 | STATE 5 | POWER FAILURE ALARM | NORMAL: 0 | MASK RELEASING: 1 | NORMAL: 0 |
| | | ERROR RATE ALARM | NORMAL: 0 | MASK RELEASING: 1 | NORMAL: 0 |

OPTICAL SWITCHING APPARATUS AND OPTICAL COMMUNICATION NETWORK SYSTEM

BACKGROUND OF THE INVENTION

The present invention relates to an optical communication network system, and more particularly to an optical communication network system for performing switching of routes of an optical signal without converting the optical signal into an electric signal.

In order to deal with a rapid increase in data traffic represented by the Internet and a sudden increase in demand for multimedia communications including images, audio and data, a higher speed operation and a larger capacity operation have been pushed ahead for a transmission line and a communication node, which constitute a communication network, and there have been progresses made in the introduction of an optical communication apparatus using an optical fiber and an optical signal. In addition, in place of a conventional communication apparatus for processing an optical signal, in which the optical signal is converted into an electric signal once, studies have been conducted on practical use of an optical cross-connect apparatus (OXC) and an optical add-drop multiplexing apparatus (OADM) for performing switching process such as switching of transmission routes/signal lines without converting an optical signal into an electric signal. The OXC and the OADM uses an optical switch as a main component for switching optical transmission lines. As an optical switch, various types have been known, e.g., a mechanical optical switch, an optical switch using a thermooptical effect, an optical switch using an electrooptical effect and the like. Among these types, the mechanical optical switch is most often used because a power loss thereof is the smallest.

For the practical use of the OXC or the OADM, it is essential to provide an apparatus, which is configured to improve basic performance such as suppression of a power loss of an optical signal or the like and to be capable of properly switching and operating signal routes (or a system itself), and to be excellent in reliability, availability and serviceability (hereinafter referred to as "RAS function"). In a conventional transmitter or a digital switching device such as a multiplexer processing an electric signal, performance of a signal to be processed has been monitored in a proper position, or a redundant configuration (e.g., duplication) in a part of an apparatus has been adopted. Thus, an apparatus having an excellent RAS function has been provided.

In the conventional case of using the electric signal, time multiplexing can be carried out up to 10 Gbps and, in principle, routes can be switched by using this technology. However, in a digital transmission system such as SONET/SDH, to execute process of high-level control management signal, 64 signals of 155 Mbps are arrayed in parallel development, and routes are switched. For such a speed, a technology for switching by using a data buffering technology without any momentary power failures power-interruption has been known.

As described above, the OXC and the OADM uses the optical switch as the main component for switching routes of an optical signal. However, in the OXC and the OADM directly processing the optical signal, there occurs a problem, in the case of the most often used mechanical optical switch, that a switching speed is slow, which is several milli-seconds at the shortest, while a transmission rate of the optical signal to be passed is 10 Gbps or higher (e.g., 40 Gbps), which is much higher than that of an electric signal. Consequently, if switching of signal routes similar to the conventional apparatus for processing an electric signal is simply executed for the OXC or the OADM, a momentary power failure occurs, where an optical signal of several million bits, that is, several tens of frames, is lost because of its inability to pass through the optical switch during optical signal route switching by the optical switch. In other words, the momentary power failure that has been prevented by the conventional apparatus for processing the electric signal occurs in the OXC or the OADM directly processing the optical signal. Thus, a need arises to realize an optical signal switching apparatus having an excellent RAS function on the assumption of presence of a momentary power failure by an optical switch.

Generally, in the OXC or the OADM, in order to maintain performance of an optical signal to be processed, after switching of optical routes, various factors are monitored, which include (1) optical signal power deterioration/failure [detection level: −20 dBm, detection time: order of 1 $\mu$sec.], (2) synchronous state of an operation clock [detection time: order of 1 $\mu$sec.], (3) synchronous state of an optical signal frame [detection time: 375 $\mu$sec,], (4) optical signal error rate (bit error rate, referred to as BER, hereinafter) [detection level: $10^{-9}$, detection time: 10 sec.], and the like. This monitoring is carried out for a predetermined time, and optical signal route (or system itself) is properly switched to another when a trouble or a possibility of a trouble is discovered. Such a trouble monitoring function is essential for an improvement of the RAS function. The detection levels and the detection times, which are bracketed in the above-described factors, are only examples, and can be properly changed depending on a speed of an optical signal to be processed by the apparatus or a size or installing place of the apparatus.

In the apparatus provided with the above-described trouble monitoring function, depending on an installing position of a monitoring circuit or a monitoring method, a momentary power failure due to route switching by the optical switch may be detected as an optical signal power failure, BER degradation or stepping-out of synchronization. Consequently, even if the switching is a normal operation, a situation may occur where an alarm is given to the downstream side of an optical signal advancing direction or an apparatus for monitoring and controlling troubles. In addition, generally, the monitoring circuit also verifies a normal state after completion of the route switching or monitors recovery from the trouble. Thus, unless monitoring is carried out by considering time necessary for route switching by the optical switch or an operation time of the above-described trouble monitoring function, even if the switching has been normally carried out, a situation may occur where an alarm is given to the downstream side of the optical signal advancing direction or the apparatus for monitoring and controlling troubles. In the OXC or the OADM, such a situation induces repeating route switching even if an operation is normal. Consequently, an operation of the entire OXC or OADM, or an operation of a communication system (network) using the OXC or the OADM becomes unstable, it brings about a state when the RAS function can not be operated as desired. Needless to say, such a situation can be prevented by introducing a protective function for extending trouble detection time, recovery monitoring time and the like. However, such a method is not preferable for an improvement of the RAS function because an original alarm monitoring ability is reduced.

Meanwhile, in the conventional communication apparatus for processing an electric signal, such as a digital switching device and the like, the one has been known, which is configured to previously mask erroneous information caused by an in-apparatus operation (e.g., system switching, hardware maintenance/switching) based on software instruction in order to prevent collection thereof and then to carry out an operation, to collect by the software an alarm or management information monitored by hardware in the apparatus, and the like. However, the masking function by the software in the conventional communication apparatus for processing an electric signal cannot simply be applied to the OXC or the OADM.

As a specific example, when an optical route is switched by the optical switch, a momentary power failure causes an optical signal power failure, and stepping-out of clock synchronization (hereinafter referred to as clock stepping-out) and stepping-out of frame synchronization (hereinafter referred to as frame stepping-out) of a transmission signal. However, recovery from the optical signal power failure is detected during switching time (about 1 milli-sec.) after completion of switching. Meanwhile, for the clock stepping-out and the frame stepping-out, after optical signal power is recovered by a new connection, new clock and frame synchronization must be performed. Time necessary for verifying re-synchronization exceeds 1 milli-sec. Further, 10000 frames are necessary for BER measurement since frame synchronization is secured, and the process must wait for 10 sec. Consequently, when correct operation of route switching is carried out by distinguishing a momentary power failure due to switching of the optical switch from a disconnection of an optical fiber as a fixed trouble, if only the conventional trouble detection method or the conventional masking function by the software simply is applied to the OXC or the OADM, the RAS function becomes short. Thus, there is a demand for an OXC or an OADM having an excellent RAS function for detecting a real trouble and switching routes in consideration of a combination of a plurality of factors for trouble detection and monitoring time thereof with a trouble detection/recovery detection operation carried out following disposition of a trouble detection circuit in an apparatus. Furthermore, there is a demand for an OXC or an OADM preventing notification of an alarm to a downstream side of an optical signal advancing direction or an apparatus for monitoring and controlling a trouble even if a momentary power failure occurs due to route switching, and preventing induced re-switching of routes while an operation is normal.

SUMMARY OF THE INVENTION

An object of the present invention is to provide a highly reliable optical communication network system for switching routes without any conversion of an optical signal, which is preventing notification of an erroneous alarm during switching by an optical switch.

In order to achieve the above-described object, according to the present invention, a configuration is adopted, where an alarm-issued from a monitor for monitoring performance of an optical signal having a route set by an optical switch is masked for a predetermined masking period from a starting time of a switching operation by the optical switch. Thus, even if an alarm is issued because of a change in performance of an optical signal by a normal switching operation of the optical switch, it is possible to prevent the alarm from being recognized as such by the system.

The monitor can be adapted to detect the performance of the optical signal regarding a plurality of predetermined factors, and to issue an alarm for each of the plurality of factors. In this case, the above-described masking period should preferably be set for each of the plurality of factors. Accordingly, it is possible to mask an alarm for each of the plurality of factors and each of the detected factors of optical signal performance only for a minimum necessary period, while optical signal performance is reduced because of the normal switching operation of the optical switch.

BRIEF DESCRIPTION OF THE DRAWINGS

Preferred embodiments of the present invention will now be described in conjunction with the accompanying drawings, in which:

FIG. 8 is an explanatory view showing a state of each bit area of an alarm register 352 and a mask register 363 in a state where a switching operation of the optical route setting apparatus 100 of FIG. 7 is not carried out, and no alarms are issued;

FIG. 9 is an explanatory view showing a masking period and an output after masking for each alarm, which are stored in an alarm management memory 344 of the optical route setting apparatus 100 of FIG. 7;

FIG. 10 is an explanatory view showing states 1 to 5 of bit areas of failure alarms and error rate alarms of the alarm register 352 and the mask register 353 of the optical route setting apparatus 100 of FIG. 7;

DESCRIPTION OF THE PREFERRED EMBODIMENTS

Next, description will be made for an optical communication network system according to an embodiment of the present invention.

Figure 1:
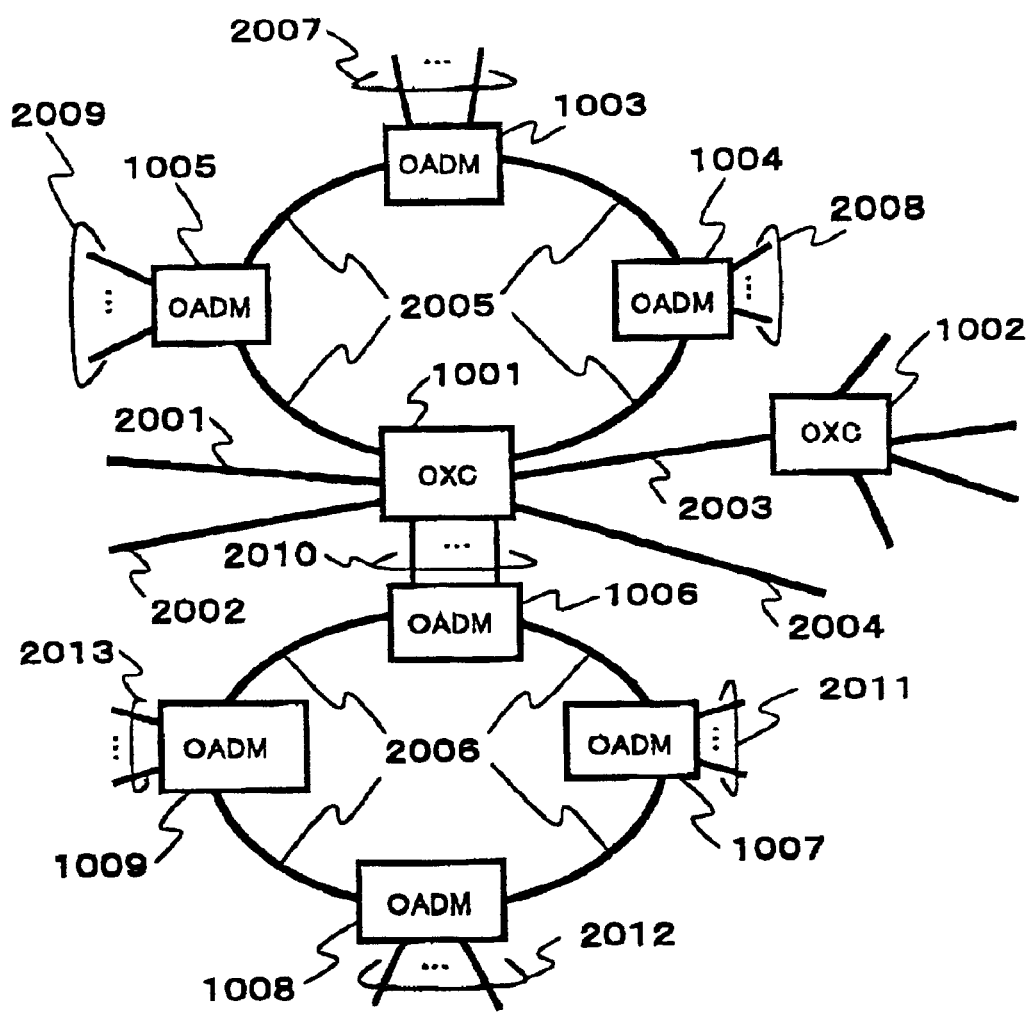
FIG. 1 is an explanatory view showing an entire configuration of an optical communication network system according to an embodiment of the present invention.

As shown in FIG. 1, an optical communication network system of this embodiment includes optical add-drop multiplexing apparatuses (OADM) 1003 to 1009 and optical cross-connect apparatuses (OXC) 1001 and 1002, which are connected through optical fibers 2001 to 2006. Specifically, the optical add-drop multiplexing apparatuses (OADM) 1003 to 1005 are connected in a ring shape through the optical fiber 2005, and optical add-drop multiplexing apparatuses (OADM) 1006 to 1009 are connected in a ring shape through the optical fiber 2006. The optical fiber 2005 and the optical fibers 2001 to 2004 are connected by the optical cross-connect apparatus (OXC) 1001. The optical cross-connect apparatus (OXC) 1001 is also connected to the optical add-drop multiplexing apparatus (OADM) 1006. The optical fiber 2003 also are connected to other optical fibers through the optical cross-connect apparatus (OXC) 1002.

Figure 12:
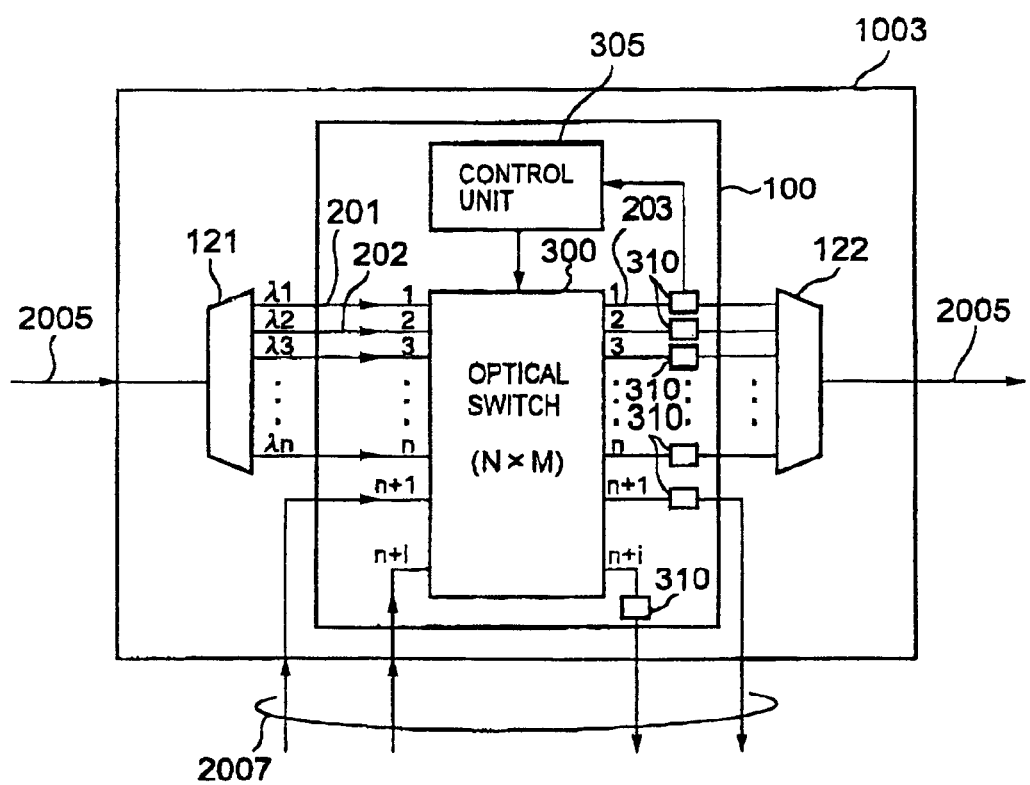
FIG. 12 is a block diagram showing a configuration of an optical add-drop multiplexing apparatus (OADM) of the optical communication network system of FIG. 1.

As shown in FIG. 12, the optical add-drop multiplexing apparatus (OADM) 1003 includes a divider 121 for division (demultiplexing) an optical signal having been subjected to wavelength-multiplexing, an optical route setting apparatus (an optical switching apparatus) 100 for switching routes of an optical signal, and a multiplexer 122 for multiplexing optical signals. Thus, a multiplexed optical signal received through the optical fiber 2005 is divided by the wavelength divider 121, and a necessary optical signal is taken out by the optical route setting apparatus 100 and output through the optical fiber 2007 to an external apparatus. The optical signal received from the external apparatus through the optical fiber 2007 is multiplexed with the other optical signal by a wavelength multiplexer 122 and sent to the optical fiber 2005. The optical add-drop multiplexing apparatuses (OADM) 1004 to 1009 are similar in configuration to the optical add-drop multiplexing apparatus (OADM) 1003. That is, a necessary optical signal is taken out from multiplexed optical signals received through the optical fibers 2005 and 2006, and output through optical fibers 2008 to 2013 to the external apparatus. The optical signal received from the external apparatus is multiplexed with the other optical signal, and then sent to the optical fibers 2005 and 2006.

Figure 13:
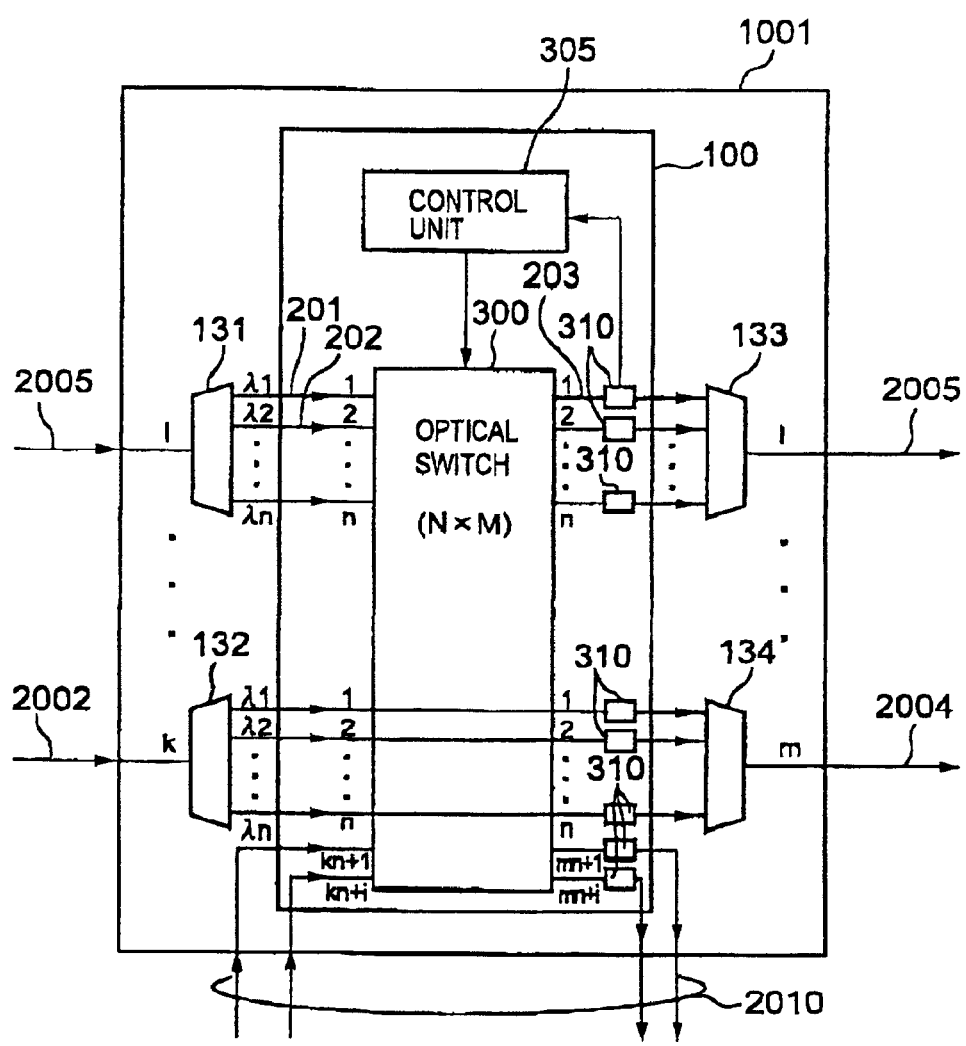
FIG. 13 is a block diagram showing a configuration of an optical cross-connect apparatus (OXC) of the optical communication network system of FIG. 1.

Meanwhile, as shown in FIG. 13, the optical cross-connect apparatus (OXC) 1001 includes divider 131, 132 and the like for division (demultiplexing) an optical signal having been subjected to wavelength-multiplexing, an optical route setting apparatus 100 for switching routes of an optical signal, and multiplexers 133, 134 and the like for multiplexing an optical signal. Thus, a multiplexed optical signal received through the optical fibers 2001, 2005 and the like is divided by the divider 131, 132 and the like, and a route is switched by the optical route setting apparatus 100 to an optical fiber, which becomes a destination for each optical signal. Then, the optical signal is multiplexed again by the multiplexers 133, 134 and the like, and output to the optical fibers 2005, 2004 and the like. In addition, the optical cross-connect apparatus (OXC) 1001 transmits and receivers an optical signal locally with the optical add-drop multiplexing apparatus (OADM) 1006 through the optical fiber 2010. The optical cross-connect apparatus (OXC) 1002 is also similar in configuration to the optical cross-connect apparatus (OXC) 1001.

As described above, each of the optical add-drop multiplexing apparatuses (OADM) 1003 to 1009 and the optical cross-connect apparatuses (OXC) 1001 and 1002 include the optical route setting apparatus 100 for switching routes without converting an optical signal into an electric signal. The optical route setting apparatus 100 includes an optical switch 300 for switching routes of an optical signal, a control unit 305 for controlling an operation of the optical switch 300, and optical performance monitors 310. The optical performance monitor 310 detects four factors: power deterioration of an optical signal passed through the optical switch 300; a synchronous state of an operation clock; a synchronous state of an optical signal frame; and an error rate of an optical signal. A result of the detection by the optical performance monitor 310 is supplied to the control unit 305.

Figure 11:
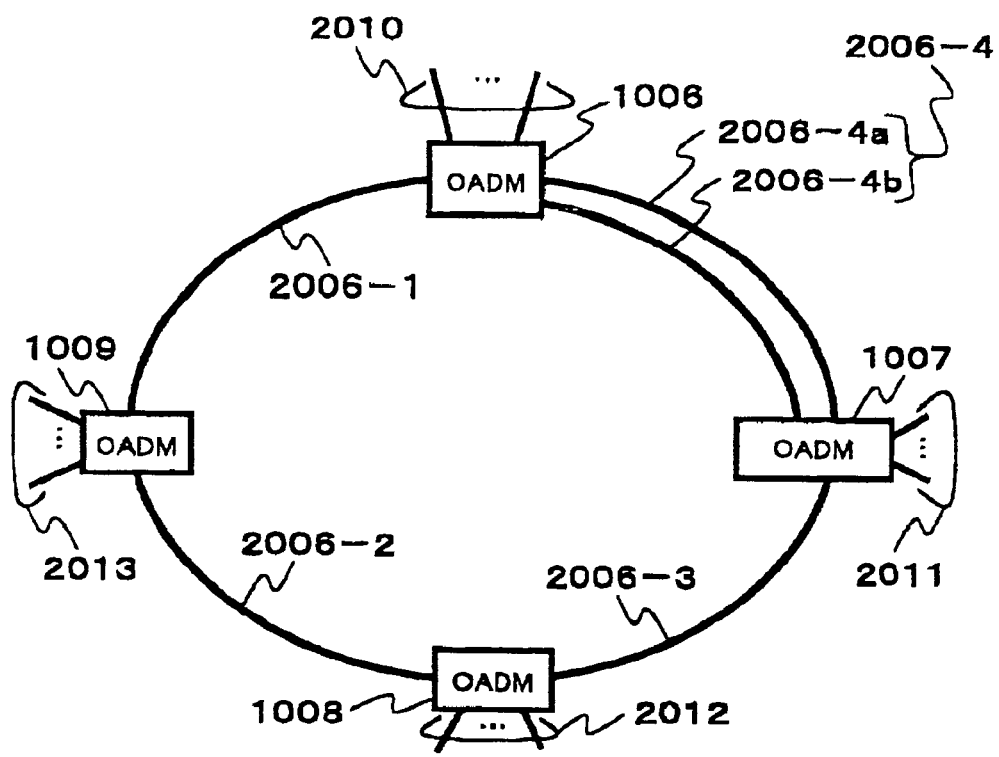
FIG. 11 is an explanatory view showing an optical fiber 2006 partially disposed double to solve a trouble in a ring of the optical fiber 2006 of the optical communication network system of FIG. 1.

The optical communication network system of the embodiment has a structure for recovery from a trouble in the case of occurrence thereof. Specifically, a transmission line is constructed by connecting the optical add-drop multiplexing apparatuses (OADM) 1006 to 1009 in a ring shape through the optical fiber 2006. As shown in FIG. 11, in this transmission line the optical fibers 2006-4 connecting between the optical add-drop multiplexing apparatuses (OADM) 1006 and 1007 are constituted of two parallel optical fibers 2006-4a and 2006-4b, and the optical add-drop multiplexing apparatuses (OADM) 1006 and 1007 can select any one of the optical fibers 2006-4a and 2006-4b by a switching operation of the optical route setting apparatus 100 to transmit an optical signal. In the transmission line of FIG. 11, normally, a communication route for transmitting an optical signal from the optical fiber 2010 to the optical fiber 2012 is preset to pass through the optical add-drop multiplexing apparatus (OADM) 1006, the optical fiber 2006-4a, the optical add-drop multiplexing apparatus (OADM) 1007, the optical fiber 2006-3, the optical add-drop multiplexing apparatus (OADM) 1008, and the optical fiber 2012. It is also arranged beforehand that a trouble occurring in the optical fiber 2006-4a is solved by switching to the optical fiber 2006-4b to transmit the optical signal. It is further arranged beforehand that troubles occurring in both of the optical fibers 2006-4a and 2006-4b are solved by switching the transmission line to pass through the optical add-drop multiplexing apparatus (OADM) 1006, the optical fiber 2006-1, the optical add-drop multiplexing apparatus (OADM) 1009, the optical fiber 2006-2, the optical add-drop multiplexing apparatus (OADM) 1008, and the optical fiber 2012. These switching operations for recovery from troubles are carried out under a supervisory and control system (OpS), not shown, which instruct route switching to the control unit 305 of the optical route setting apparatus 100 of each of the optical add-drop multiplexing apparatuses (OADM) 1006 to 1009, or under self-judgment of the control unit 305.

In the embodiment, a mechanical optical switch is used for the optical switch 300 of the optical route setting apparatus 100. This optical switch 300 includes optical fibers disposed with end surfaces facing each other, and a driver for mechanically shifting one of the optical fibers vertically. By moving the optical fiber with the driver, a positional relation is set, where the optical switch faces end surfaces of optical fibers disposed adjacently to each other, and carries out switching. Such a mechanical optical switch requires several milli-sec. at the shortest from a start of a switching operation to an end thereof and, during this period, a momentary power failure occurs, where the optical signal cannot be passed through the optical switch 300 and lost. In addition, during the switching operation, stepping-out of an operation clock synchronization of a signal and stepping-out of an optical signal frame synchronization thereof occur. Thus, even when a set route of the optical route setting apparatus 100 is changed without any troubles or the like, during the switching operation of the optical switch 300, a momentary power failure or stepping-out is detected by the optical performance monitor 310. When a trouble is recognized while the switching operation is actually normal, a recovery operation from the trouble is started as described above with reference to FIG. 11. Thus, according to this embodiment, the optical route setting apparatus 100 is constructed in the following manner, and an optical communication network system excellent in reliability, availability and serviceability is provided by using the optical switch 300.

By properly selecting components, the optical route setting apparatus 100 of the embodiment can readily construct a flexible communication network capable of dealing with various transmission rates and multiplexing degrees of optical signals. For example, an optical signal or the like having a transmission rate of STM-0 (51.84 MHz) set by ITU-T Recommendation can be used, and there are no limitations on presence of wavelength-division-multiplexing or the number thereof.

First, description will be made for features of the optical route setting apparatus of this embodiment with reference to a simplified configuration of FIG. 2. In the simplified optical route setting apparatus 100 of FIG. 2, attention is paid to a switching operation of one of the optical switches N×N or N×M of FIG. 12 or 13, and two input signals 1 and 2, and one output signal are shown. The input signals 1 and 2 are respectively inputted from routes 201 and 202 to the optical switch 300, and one selected by the optical switch 300 is outputted from a route 203. The optical signal outputted from the route 203 is passed through the optical performance monitor 310, and is detected about four factors, i.e., power deterioration of the optical signal, a synchronous state of an operation clock, a synchronous state of an optical signal frame and an error rate of the optical signal. Then, if each factor is lower than a predetermined value, an alarm is issued for each of the four factors. The control unit 305 includes a system control unit 302, an alarm mask 303, and a timer 304. The system control unit 302 controls route switching of the optical switch 300, and collects alarm information from the optical performance monitor 310 through the alarm mask 303. The alarm mask 303 includes an optical power failure alarm mask 303a, an operation clock synchronization stepping-out alarm mask 303b (herein after referred to as "operation clock stepping-out alarm mask 303b"), a frame synchronization stepping-out alarm mask 303c (herein after referred to as "operation clock stepping-out alarm mask 303c") and an error rate alarm mask 303d corresponding to factors, for which the optical performance monitor 310 issues alarms during optical route switching.

Figure 3:
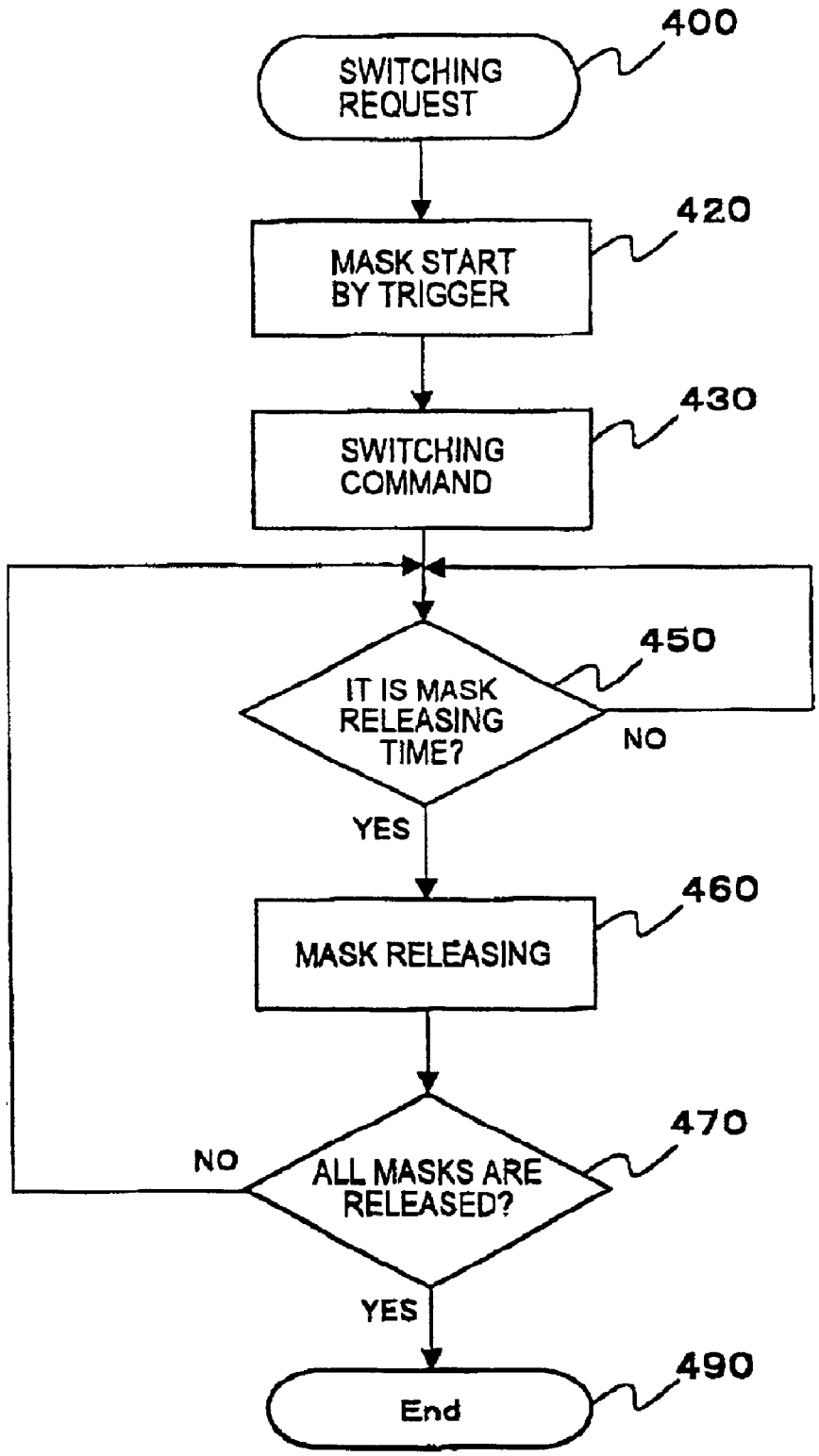
FIG. 3 is a flowchart showing a process for switching of optical routes in the optical route setting apparatus 100 of FIG. 2.

Hereinafter, description will be made for an optical route switching operation of the optical route setting apparatus 100 by referring to the flowchart of FIG. 3. After an input of a route switching request from the supervisory and control system (OpS) or the like, not shown, to the system control unit 302 (step 400), the system control unit 302 actuates a timer 304 by a trigger signal and sets the alarm mask 303 in a masking state (step 420). The system control unit 302 has a built-in memory, in which masking periods of the optical power failure alarm mask 303a, the operation clock stepping-out alarm mask 303b, the frame stepping-out alarm mask 303c and the error rate alarm mask 303d are prestored. The system control unit 302 reads each stored masking period, and sets the masking period in the timer 304 corresponding to an alarm of each of the four factors. In this embodiment, the masking periods of the optical power failure alarm mask 303a, the operation clock stepping-out alarm mask 303b and the frame stepping-out alarm mask 303c are set equal to 10 ms, and the masking period of the error rate alarm mask 303d is set equal to 15 s. In the case of a normal switching operation, these masking periods are preset to individual periods necessary until a normal state is recovered from the alarm state.

After the setting of the alarm mask 303, the system control unit 302 sends a switching command signal to the driver of the optical switch 300, and the driver switches optical routes (step 480). Immediately after the switching of the optical routes, a failure occurs in the optical signal, operation clock stepping-out and optical signal frame stepping-out can occur, and an error rate cannot be correctly measured. Therefore, alarms are issued from the optical performance monitor 310. However, since these have been masked respectively by the alarm masks 303a, 303b, 303c and 303d, the system control unit 302 recognizes no alarms. After completion of the optical route switching, and passage of the set masking period, the timer 304 outputs mask releasing signals respectively to the above-described four alarm masks 303a, 303b, 303c and 303d (step 450), and releases the masks (step 460). When all the alarm masks 303a, 303b, 303c and 303d are released (step 470), the process returns to a normal alarm monitoring state for the four alarms (step 490).

Now, description will be made for an operation of the optical route setting apparatus 100 by referring to time charts of FIGS. 4(a) to (h), FIGS. 5(a) to (h), and FIGS. 6(a) to (h).

Figure 2:
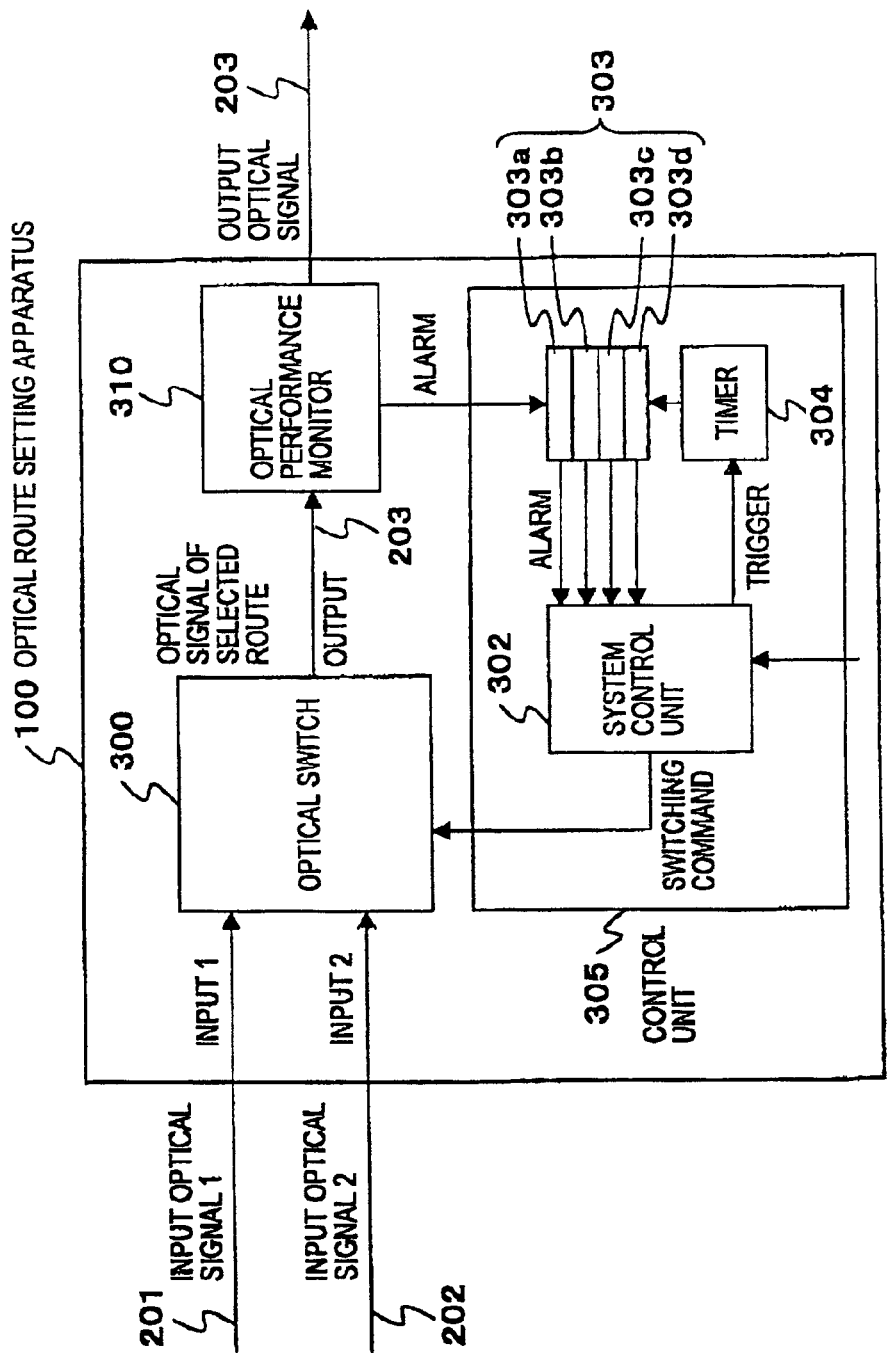
FIG. 2 is a block diagram showing a basic configuration of an optical route setting apparatus 100 used for the optical communication network system of the embodiment of the present invention.

First, by using the time charts of FIGS. 4(a) to (h), description is made for a case where the optical switch 300 of the optical route setting apparatus of FIG. 2 is normally switched.

Figure 4:
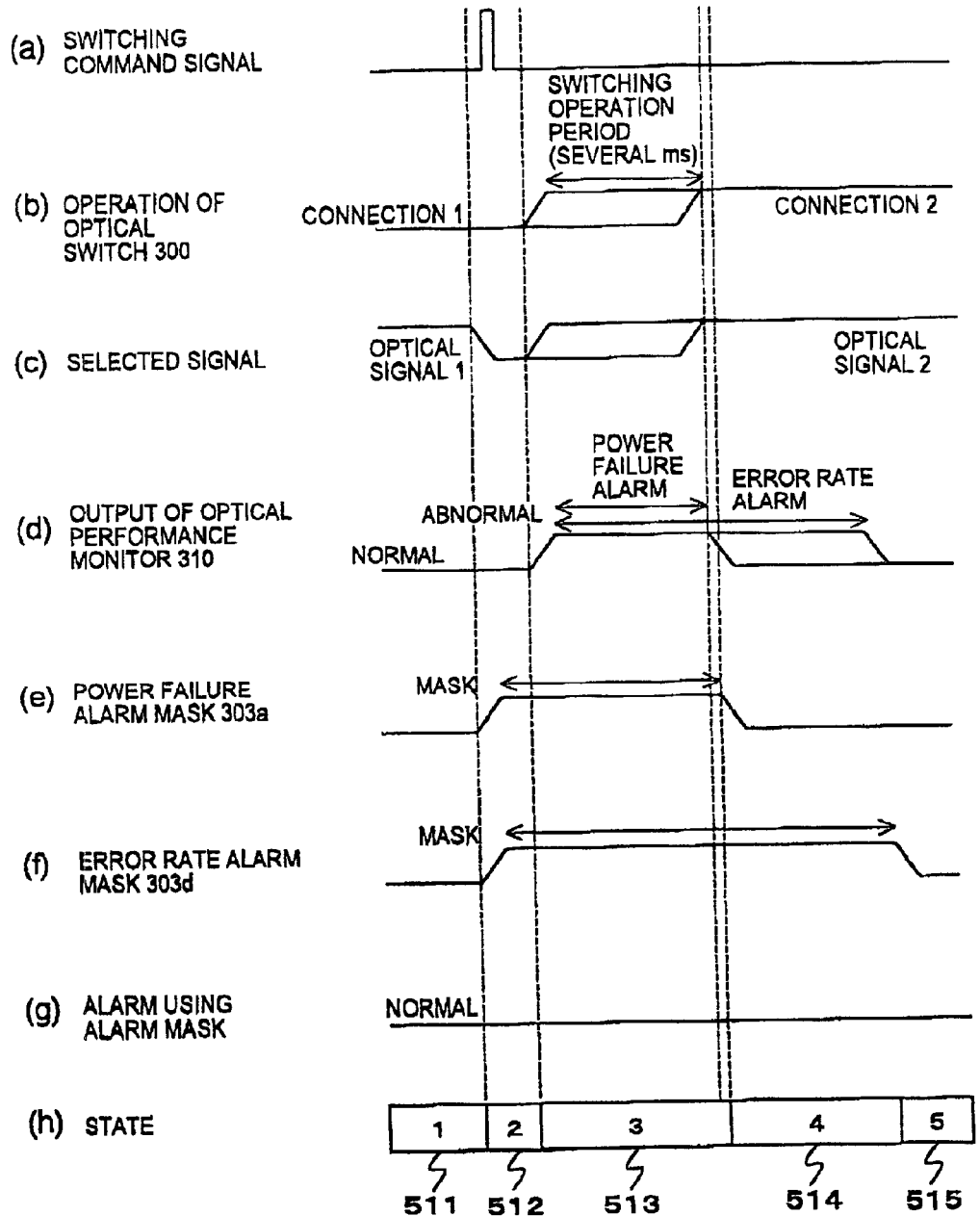
FIGS. 4(a) to (h) are explanatory views showing states of respective portions and signal time charts when an optical route switching operation is normally carried out in the optical route setting apparatus 100 of FIG. 2.

Here, it is assumed that the optical switch 300 switches a signal outputted from the output route 203 from an optical signal 1 to an optical signal 2. A state changed with time is shown in FIG. 4(h). A state before switching is a "STATE 1" 511 of FIG. 4(h). When there is a switching request, the system control unit 302 executes the operation of step 420 to set masks in the optical power failure alarm mask 303a, the operation clock stepping-out alarm mask 303b, the frame stepping-out alarm mask 303c and the error rate alarm mask 303d. Accordingly, a "STATE 2" 512 of FIG. 4(h) is set. Here, states of only an optical power failure alarm mask 504 and an error rate alarm mask 505 are shown in FIGS. 4(e) and (f).

The system control unit 302 executes the operation of step 430 to send a switching command signal (FIG. 4(a)) to the driver of the optical switch 300. In the optical switch 300 operates the driver operates to change mechanically a connection state, realizing a change from connection 1 to connection 2, and a selected signal (FIG. 4(c)) of the optical switch 300 is switched from the optical signal 1 to the optical signal 2. Time necessary for this switching operation of the optical switch 300 is about several ms, and a state executing this switching operation is a "STATE 3" 513 of FIG. 4(h).

In the "STATE 3" 513, the optical signal cannot be passed through the optical switch 300. Thus, a power failure of the optical signal occurs, and an optical power failure alarm is issued from the alarm monitor 310. Moreover, since the error rate cannot be measured due to the optical power failure, the error rate alarm is also issued. In this "STATE 3" 513, since masks are set in the optical power failure alarm mask 303a and the error rate alarm mask 303d as shown in FIGS. 4(e) and (f), no alarm signals are outputted from the alarm masks 303a and 303d to the system control unit 302 as shown in FIG. 4(g), and the system control unit 302 recognizes a state as normal. After completion of the switching operation of the optical switch 300, the optical power failure alarm is released because of recovery of the optical power. Then, the optical power failure alarm mask 303a is released by the operations of steps 450 and 460, a "STATE 4" 514 is set. Though not shown, in the "STATE 3" 513, operation clock stepping-out and frame stepping-out occur following the switching operation, and alarms are issued from the optical performance monitor 310. However, since there are masks set in the operation clock stepping-out alarm mask 303b and the frame stepping-out alarm mask 303c, no alarm signals are outputted to the system control unit 302. During this masking period, the optical performance monitor 310 re-takes operation clock synchronization and frame synchronization, and releases the alarms. In addition, the optical performance monitor 310 starts measurement of an error rate in matching with the optical power recovery. The error rate measurement takes time, an error rate alarm is continued, and a normal state is recovered after a passage of certain time. Then, the error rate alarm mask 505 has its mask released after a passage of time required for measurement (steps 450 and 460), and a "STATE 5" 515 is set.

As a result, no alarms are issued from the alarm mask 303 to the system control unit 302 during switching to a normal signal, always setting a normal state.

Next, description will be made for a case where, after the switching operation of the optical switch 300 of the optical route setting apparatus of FIG. 2, an optical signal power failure state is set by referring to time charts of FIGS. 5(a) to (h).

Figure 5:
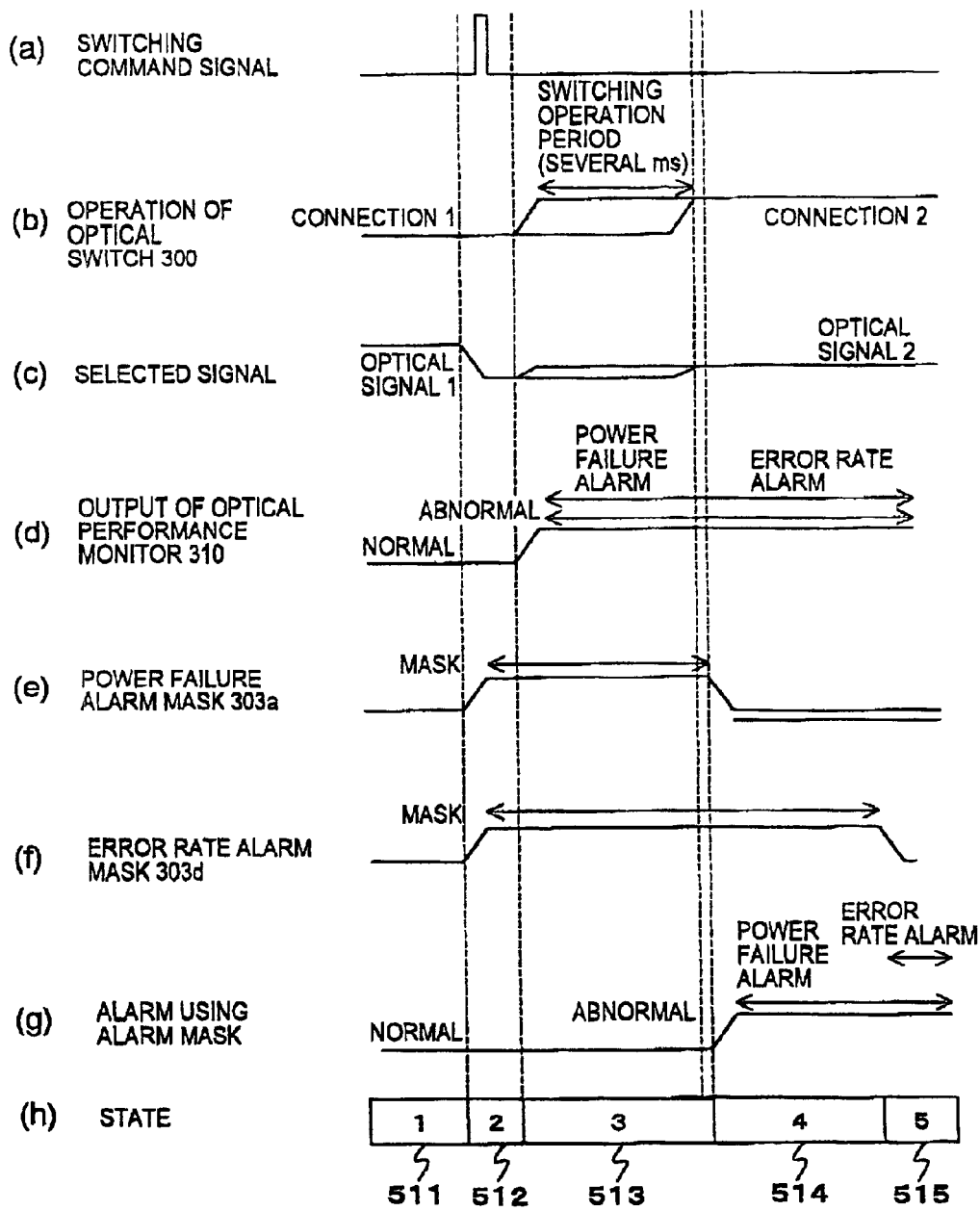
FIGS. 5(a) to (h) are explanatory views showing states of the respective portions and signal time charts when an optical power failure alarm is issued after an optical route switching operation in the optical route setting apparatus 100 of FIG. 2.

Causes of an optical signal power failure state after switching are, for example, a case where an intensity itself of the optical signal 2 input to the optical switch 300 is weak, a case where the switching operation of the optical switch 300 is not carried out normally, and the like. In this case, until a "STATE 2" 512 of FIG. 5(h) is similar to the "STATE 2" 512 of FIGS. 4(a) to (h). In a "STATE 3" 513, an optical signal power failure occurs by the switching operation of the optical switch 300, and an optical power failure alarm and an error rate alarm are issued from the optical performance monitor 310. The optical power failure alarm mask 303a is masked until a "STATE 3" 513 where the switching of the optical switch 300 is completed. In a normal case similar to that shown in FIG. 4(d), the optical power failure alarm is released before an end of the "STATE 3" 513. However, if the optical signal 2 is abnormal and its intensity is weak as shown in FIG. 5(c), the optical power failure alarm of the optical performance monitor 310 continues even after the mask of the optical power failure alarm mask 303a is released. Thus, at a point of time when a "STATE 4" 514 is set, an optical power failure alarm is issued from the optical power alarm mask 303a to the system control unit 302, and the system control unit 302 recognizes the failure alarm. In this case, since the optical power failure continues, an error rate alarm also continues. From a point of time when a "STATE 5" 515 is set, an error rate alarm is issued from the error rate alarm mask 303d to the system control unit 302, and the system control unit 302 recognizes the error rate alarm. Accordingly, the system unit 302 notifies an occurrence of a trouble to the supervisory and control system (OpS) and, under instruction of the supervisory and control system (OpS), a new route switching operation is started to make recovery from the trouble shown in FIG. 11.

Next, description will be made for a case where an error rate of an optical signal is reduced after the switching operation carried out by the optical switch 300 of the optical route setting apparatus of FIG. 2, by referring to the time charts of FIGS. 6(a) to (h).

Figure 6:
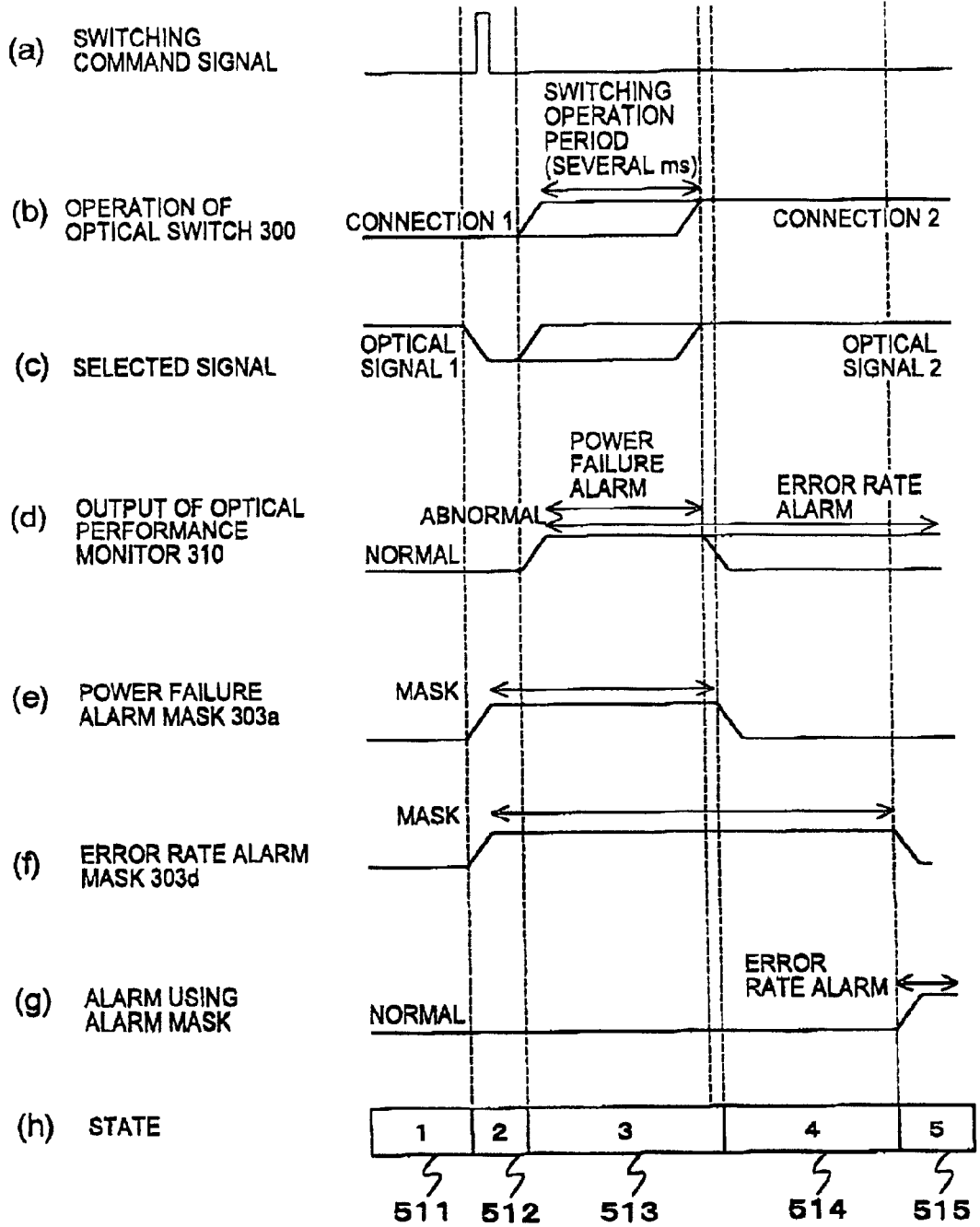
FIGS. 6(a) to (h) are explanatory views showing states of the respective portions and signal time charts when an error rate alarm is issued after the optical route switching operation in the optical route setting apparatus 100 of FIG. 2.

Causes of deteriorations in error rates after switching are, for example, a case where there is much noise in an optical signal 2 itself inputted to the optical switch 300, a case where interference occurs in the optical switch 300 because of the switching operation of the optical switch 300. In this case, a state until a "STATE 4" 514 of FIG. 6(h) is similar to a state until the "STATE 4" 514 of FIGS. 4(a) to (h). In the case of normal switching, as shown in FIG. 4(d), until the period of the "STATE 4" 514, the error rate alarm is released. However, in the case of FIG. 6(d), since the error rate is reduced in the optical signal 2, the error rate alarm continues even when a "STATE 5" 515 is set, where the error rate alarm mask 303d is released in FIG. 6(f). Accordingly, in the "STATE 5" 515, an error rate alarm is issued from the error rate alarm mask 303d to the system control unit 302, and the system control unit 302 then recognizes the error rate alarm. Thus, the system control unit 302 notifies an occurrence of a trouble to the supervisory and control system (OpS) and, under instruction of the supervisory control system (OpS), a new route switching operation is started to make recovery from the trouble, as shown in FIG. 11.

Next, description will be made for a specific configuration of the optical route setting apparatus 100 of the embodiment by referring to FIG. 7. This optical route setting apparatus 100 monitors optical performance in an optical synchronous network (SONET) of 10 Gbit/s, and uses an optical switch 300 of switching time 1 ms. The optical route setting apparatus 100 includes N×N optical switches 300, an optical performance monitor 310 disposed in each of output routes, amounting to N in number, of the optical switches 300, and a control unit 305.

The optical performance monitor 310 includes an optical splitter 361 for splitting an output of the optical switch 300, a power monitor 362 for detecting whether or not split optical power is equal to a predetermined value or higher, a photoelectric converter 363 for converting an optical signal output from the optical switch 300 into an electric signal, a performance monitoring circuit 364 for evaluating clock synchronization, frame synchronization and a bit error rate regarding the electric signal obtained by the conversion, and an electrooptical signal converter 365 for re-converting the electric signal into an optical signal. The power monitor 362 issues an optical power failure alarm when power of an optical signal is lower than a predetermined value. The performance monitoring circuit 364 monitors synchronous states of a reference clock output from a built-in reference clock circuit with clock and frame signals extracted from a received electric signal, outputs an operation clock stepping-out alarm and a frame stepping-out alarm when stepping-out occurs, takes synchronization again within a fixed time, and stops the alarms when synchronization is established. In addition, the performance monitoring circuit 364 detects a bit error rate of an electric signal, and issues an error rate alarm when the error rate is lowered than a predetermined value.

The control unit 305 includes an alarm masking unit 303, a timer 346, and a portion equivalent to the system control unit 302 of FIG. 2. In the configuration of FIG. 7, the portion equivalent to the system control unit 302 includes a CPU 342, a switching information memory 343, an alarm management memory 344, a switching control circuit 345 and an I/O unit 341.

The alarm masking unit 303 includes an alarm interface circuit 354 for receiving four kinds of alarms from the optical performance monitors 310 amounting to N in number, an alarm register 352 for storing the alarms, a mask register 353 for setting an alarm mask, and an alarm issuing unit 351. As shown in FIG. 8, corresponding to output ports (routes), amounting to N in number, of the optical switch 300, the alarm register 352 has areas (bit areas) for writing "0" (normal) or "1" (there is an alarm), which indicate whether or not the optical performance monitor 310 issues a failure alarm, an error rate alarm, an operation clock stepping-out alarm and a frame stepping-out alarm. Similarly, corresponding to the output ports (routes), amounting to N in number, of the optical switch 300, the mask register 353 has areas (bit areas) for writing "0" (mask is set)" or "1" (mask is released) indicating whether or not masks are respectively set in a failure alarm, an error rate alarm, an operation clock stepping-out alarm and a frame stepping-out alarm. The alarm issuing unit 351 of the mask register 353 obtains a product of "0" or "1" written in the corresponding areas of the alarm register 352 and the mask register 353, and outputs the alarm of its output port, if "1", to the CPU 342.

Writing of "0" or "1" in the alarm register 352 is carried out by the alarm interface circuit 354. Writing of "0" or "1" in the mask register 353 is carried out by the CPU 342, which refers to a masking period of each alarm prestored in the alarm management memory 344 as shown in FIG. 9, and operates the timer 346. In the switching information memory 343, a switching state of the optical switch 300 is stored. The masking period of each alarm prestored in the alarm management memory 344 has been decided based on the use of optical performance monitoring in the optical synchronous network (SONET) of 10 Gbit/s and an optical switch of switching time 1 ms. In this case, as shown in FIG. 9, the masking periods are set at 10 ms for a failure alarm, an operation clock stepping-out alarm and a frame stepping-out alarm, and at 15 s for an error rate alarm.

Now, description will be made concretely for an operation of the control unit 305 of the optical route setting apparatus 100 of FIG. 7.

First, description will be made for a state where an input port 201-1 is connected to an output port 203-N by the optical switch 300 and normally operated (no switching operations are carried out). In the mask register 353, as shown in FIG. 8, "1" is written, indicating that all masks are released. Since there are no alarms issued from the optical performance monitor 310, a value of the alarm register 352 is "0" indicating that all are normal. This case is a "STATE 1" 611 shown in FIG. 10. Thus, no alarms are issued from the alarm issuing unit 351 to the CPU 342. FIG. 10 shows only a failure alarm and an error rate alarm as kinds of alarms, and an operation clock stepping-out alarm and a frame stepping-out alarm are not shown. In this case, the timer 346 is reset.

When a bit error trouble occurs in an optical signal of the input port 201-1, a degradation in a bit error rate is detected by the performance monitoring circuit 364 in the optical performance monitor 360 of the output port 203-N, and an alarm is issued. This alarm is received by the alarm interface circuit 354, and "1" indicating presence of an alarm is written in a bit area corresponding to a bit error rate of a port N of the alarm register 352. In this case, since 1 indicating mask releasing is set in the mask register 358, an alarm is issued from the alarm issuing unit 351, and then received by the CPU 342. Determining that a trouble has occurred, the CPU 342 notifies the trouble to the supervisory and control system (OpS) and, under instruction of the supervisory and control system (OpS), a route switching operation is started for recovery from the trouble shown in FIG. 11.

Next, description will be made for an operation when the CPU 342 receives, through the I/O unit 341, instruction to switch the input port connected to the output port 203-N of the optical switch 300 from the input port 201-1 to the input port 201-N.

Before issuing a switching command of the optical switch 300, the CPU 342 sets the alarm mask 303 and starts the timer 346. First, "0" indicating mask setting is written in each of bit areas corresponding to an optical power failure alarm, an error rate alarm, an operation clock stepping-out alarm and a frame stepping-out alarm of the output port 203-N of the mask register 353 of the alarm mask 303. Then, a masking period of each alarm is read from the alarm management memory 344, set in the timer 346, and the timer 346 is started. Accordingly, a "STATE 2" 612 of FIG. 10 is set. In response to a switching request received from the I/O unit 341, the CPU 342 calculates a new switching state from the switching information memory 343, and outputs a switching command from the switching control unit 345 to the optical switch 300. The optical switch 300 operates the driver to connect the input port 201-N to the output port 203-N according to the switching command. The CPU 342 stores a new state in the switching information memory 343.

By the switching operation of the optical switch 300, an optical power failure occurs in an output optical signal of the output port 203-N. The power monitor 362 of the optical performance monitor 310 of the output port 203-N detects the optical power failure, and issues an optical power failure alarm. The optical power failure alarm is received by the alarm interface circuit 354, and the alarm interface circuit 354 sets a value of a bit area corresponding to the optical power failure alarm of the port N of the alarm register 352 to "1" indicating presence of an alarm. The performance monitoring circuit 364 detects an error rate degradation, operation clock stepping-out and frame stepping-out, and issues respective alarms. These alarms are received by the alarm interface circuit 354, and the bit areas of the error rate alarm, the operation clock stepping-out alarm and the frame stepping-out alarm of the port N of the alarm register 352 are set to "1" indicating presence of an alarm. In this case, as described above, in the mask register 353, "0" indicating masking is set in the bit area corresponding to each alarm of the port N. Accordingly, a result of obtaining a logical product of the alarm register 362 and the mask register 353 by the alarm issuing unit 351 is "0", and thus the alarm issuing unit 351 issues no alarms. This is a "STATE 3" 613 of FIG. 10. In the case of an optical power failure, since an error rate cannot be measured, the performance monitoring circuit 364 stops error rate measurement until optical power is verified, and resumes the error rate measurement after recovery of the optical power.

Switching by the optical switch 300 is completed after about 1 ms from the reception of the switching command, and the optical signal reaches the output port 203-N. Since the optical signal also reaches the power monitor 362, the detection of the optical power failure alarm is released and, by the alarm interface circuit 354, "0" indicating a normal state is written in the bit area of the optical power failure alarm of the port N of the alarm register 352. After 10 ms from the switching, optical power failure alarm mask releasing time is notified from the timer 353 to the CPU 342, and "1" indicating mask releasing is written in the optical power failure bit area of the mask register 353. In this case, since the optical power failure alarm has been released, the alarm issuing unit 351 gives no alarms to the CPU 342. This is a "STATE 4" 614 of FIG. 10.

The performance monitoring circuit 364 of the optical performance monitor 310 of the output port 203-N resumes the error rate measurement after recovery from the optical power failure and, with a passage of a predetermined time (about 10 sec.), an error rate of $10^{-9}$ or lower can be measured. Accordingly, the error rate alarm is released and, through the alarm interface circuit 354, "0" indicating a normal state is written in the bit area of the error rate alarm of the port N of the alarm register 352.

After 15 sec., the error rate alarm releasing time is notified from the timer 346 to the CPU 342, and "1" indicating mask releasing is written in the bit area of the error rate alarm of the port N of the mask register 353. In this case, since the error rate alarm has been released, and "0" has been written in the corresponding bit area of the alarm register, the alarm issuing unit 361 gives no alarms to the CPU 342. After all the masks are released, the process returns to a normal state "STATE 5" 615.

If the corresponding bit area of the alarm resister 352 is "1" indicating an abnormal state even when a mask releasing time specified by the timer 346 is reached, and "1" indicating mask releasing is written in the mask register 353, the alarm issuing unit 351 issues an alarm to the CPU 342. Determining that a trouble has occurred, the CPU 342 notifies the trouble to the supervisory and control system (OpS) and, under instruction of the supervisory and control system (OpS), a new route switching operation is started for recovery from the trouble shown in FIG. 11, or automatic switching is carried out for self-recovery.

As described above, the optical route setting apparatus 100 of the embodiment executes alarm masking for an optical signal power failure, an error rate degradation, operation clock stepping-out and frame stepping-out, which occur following the normal switching operation of the optical switch 300, and thus erroneous recognition of an occurrence of troubles can be prevented. That is, alarms received from the performance monitor 310 are distinguished between (1) one caused by a trouble and (2) one caused by a route switching operation of the optical switch 300, and issuance of an alarm to the other connected apparatus is controlled. Specifically, in the case of (2), an alarm is prevented from being issued to the other optical add-drop multiplexing apparatus (OADM) 1003, the optical cross-connect apparatus (OXC) 1001 or the supervisory and control system (OpS) (not shown), which is connected through the optical fibers 2005, 2006 or the like to the self apparatus. Thus, there is no possibility of starting a new route switching operation or the like for recovery from a trouble despite of the normal switching operation of the optical switch 300. Therefore, it is possible to provide a highly reliable optical route setting apparatus.

In addition, in the optical route setting apparatus 100 of the embodiment, proper alarm masking periods can be set for the plurality of factors, i.e., an optical signal power failure, an error rate degradation, operation clock stepping-out and frame stepping-out. Accordingly, without reducing detection accuracy of an occurrence of real troubles, erroneous recognition of an alarm following the normal switching operation of the optical switch can be prevented, thus enhancing reliability.

Therefore, by using the optical add-drop multiplexing apparatus (OADM) and the optical cross-connect apparatus (OXC) for the optical route setting apparatus 100 of the embodiment, it is possible to provide an optical add-drop multiplexing apparatus (OADM), an optical cross-connect apparatus (OXC) and an optical communication network system, which are all excellent in reliability, availability and serviceability.

Figure 7:
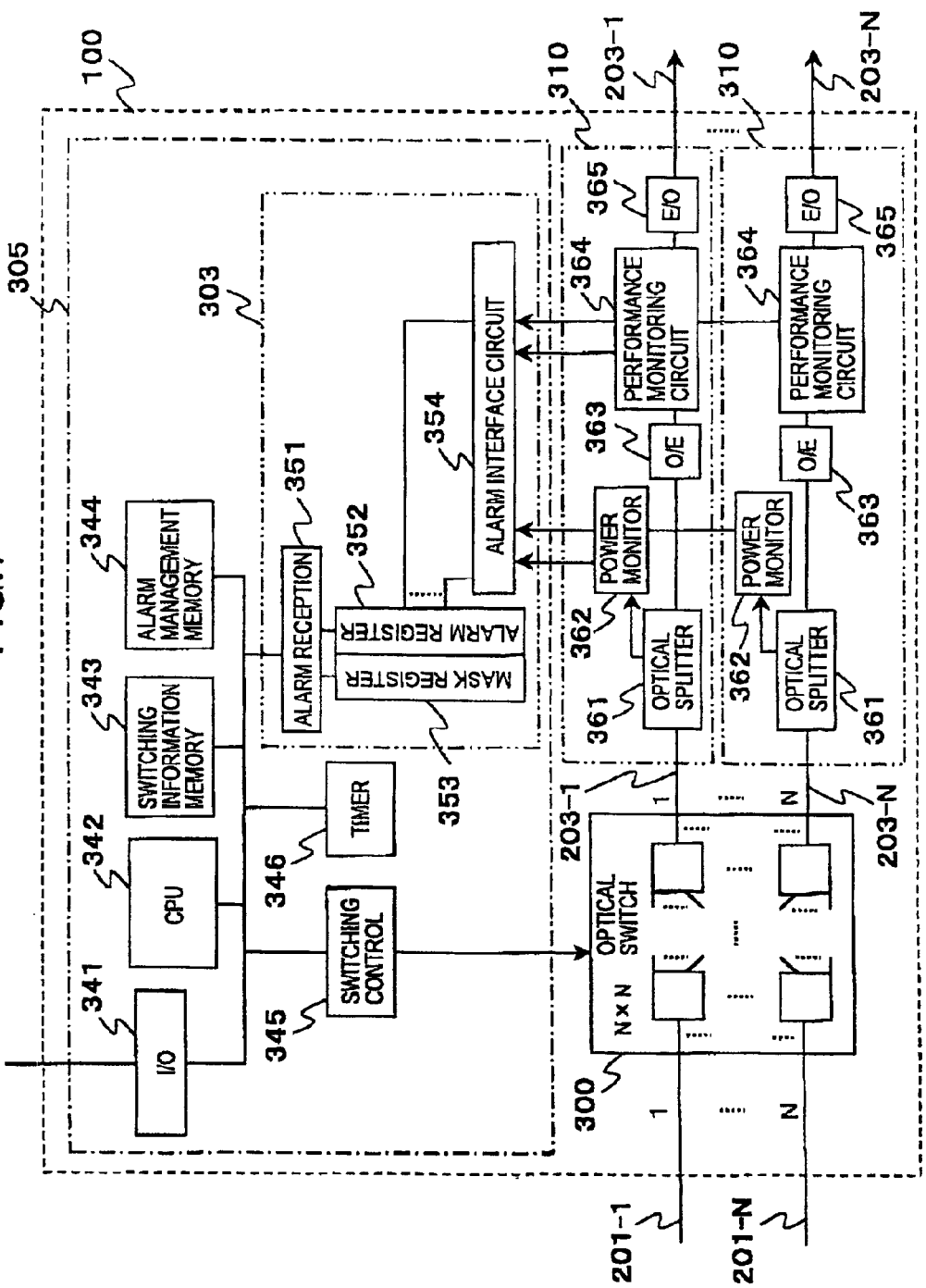
FIG. 7 is a block diagram showing a specific configuration of the optical route setting apparatus 100 used for the optical communication network system of the embodiment of the present invention.
Figure 14:
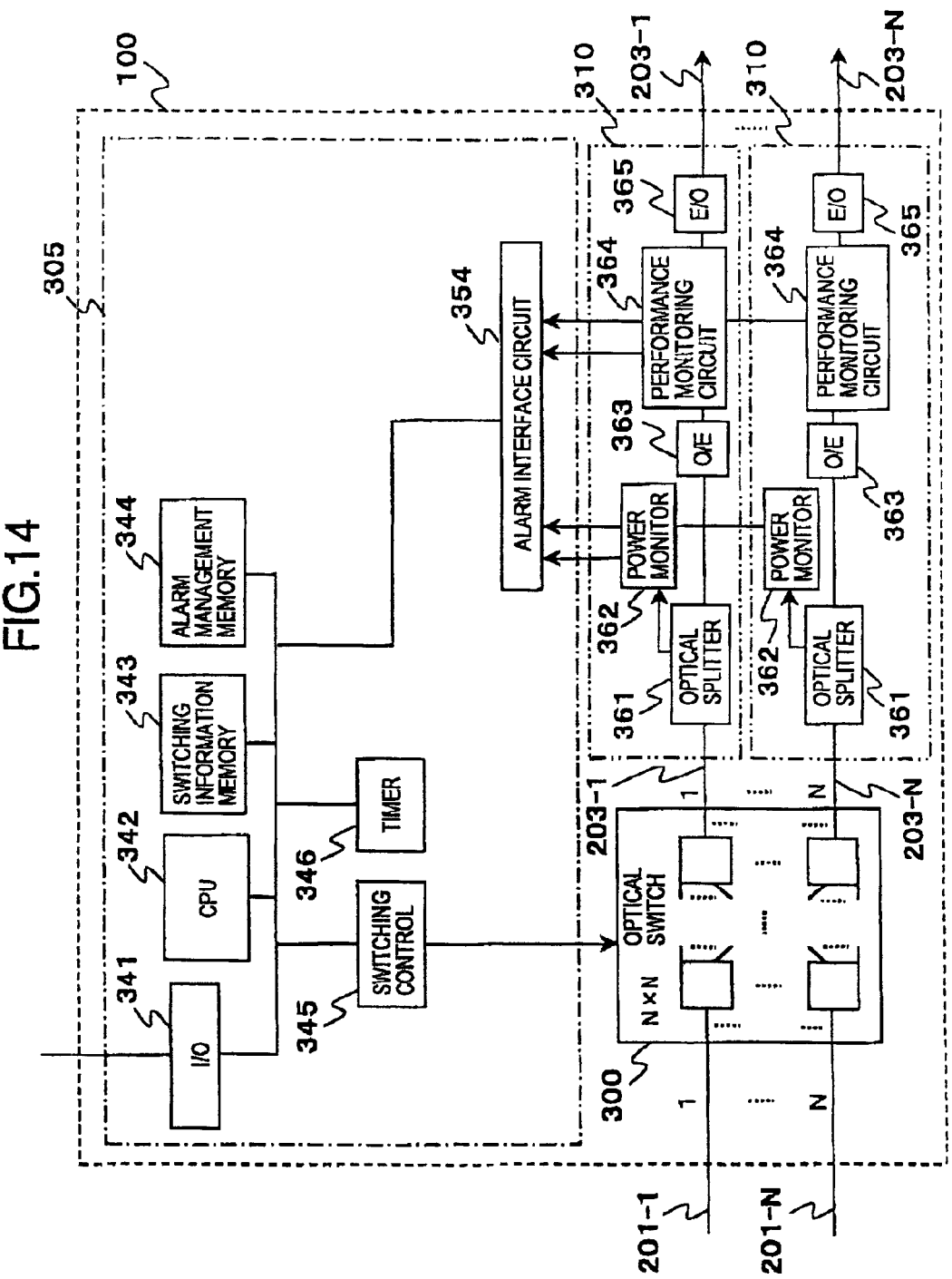
FIG. 14 is a block diagram showing a configuration of the optical route setting apparatus 100 of the embodiment of the present invention, where an alarm mask is achieved by software.
Figure 15:
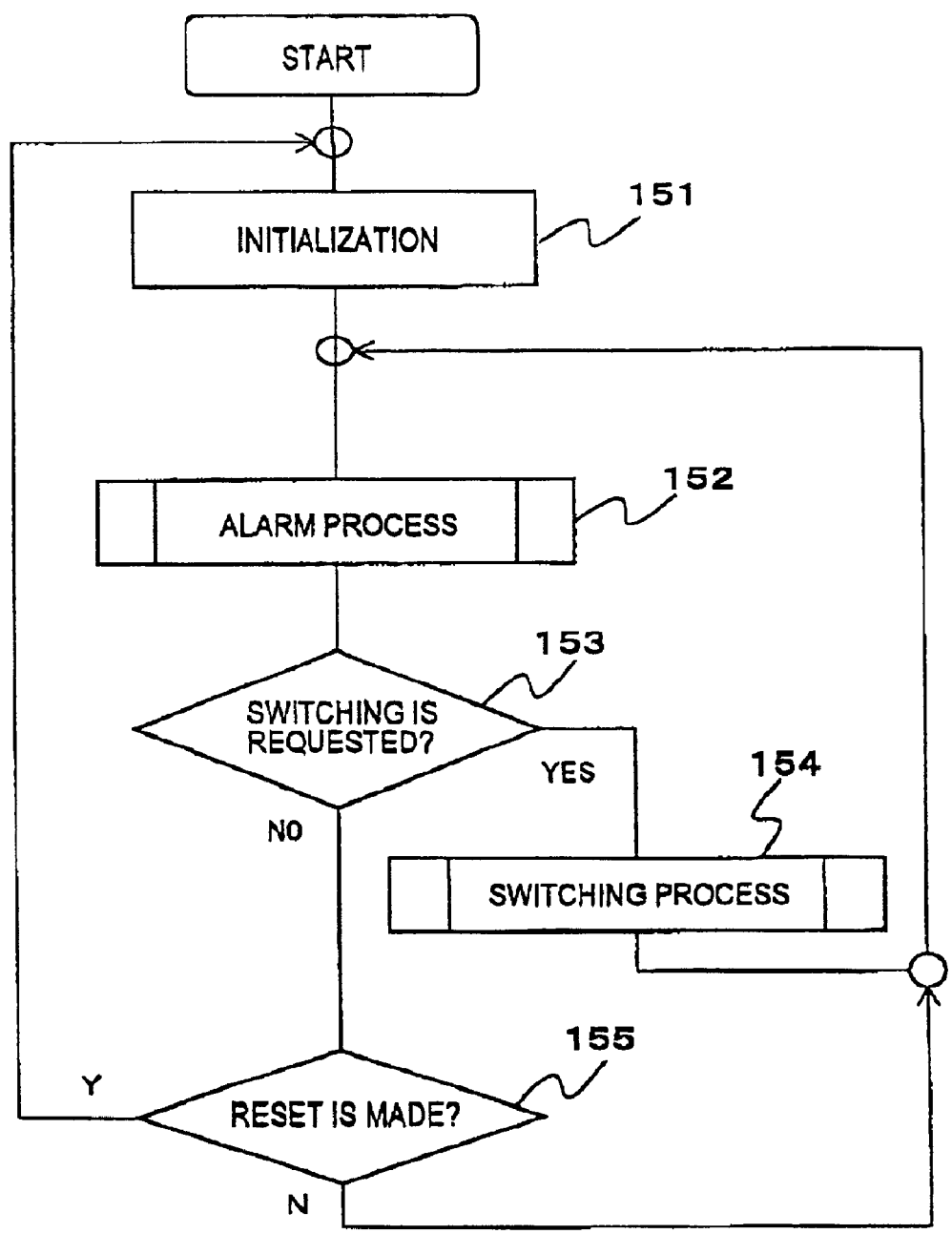
FIG. 15 is a flowchart showing an operation of a CPU 342 of the optical route setting apparatus 100 of FIG. 14.
Figure 16:
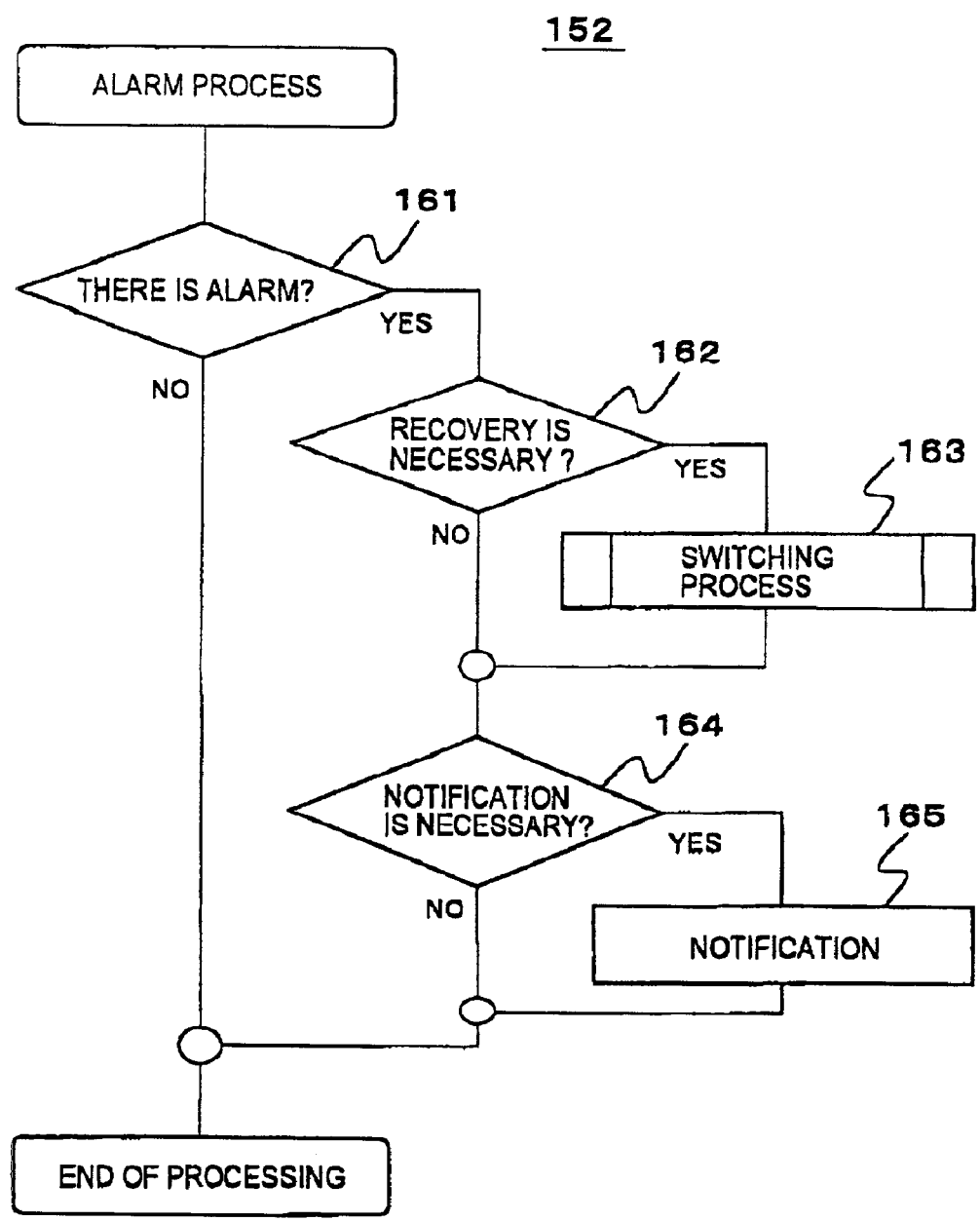
FIG. 16 is a flowchart showing an operation of the CPU 342 of the optical route setting apparatus 100 of FIG. 14.
Figure 17:
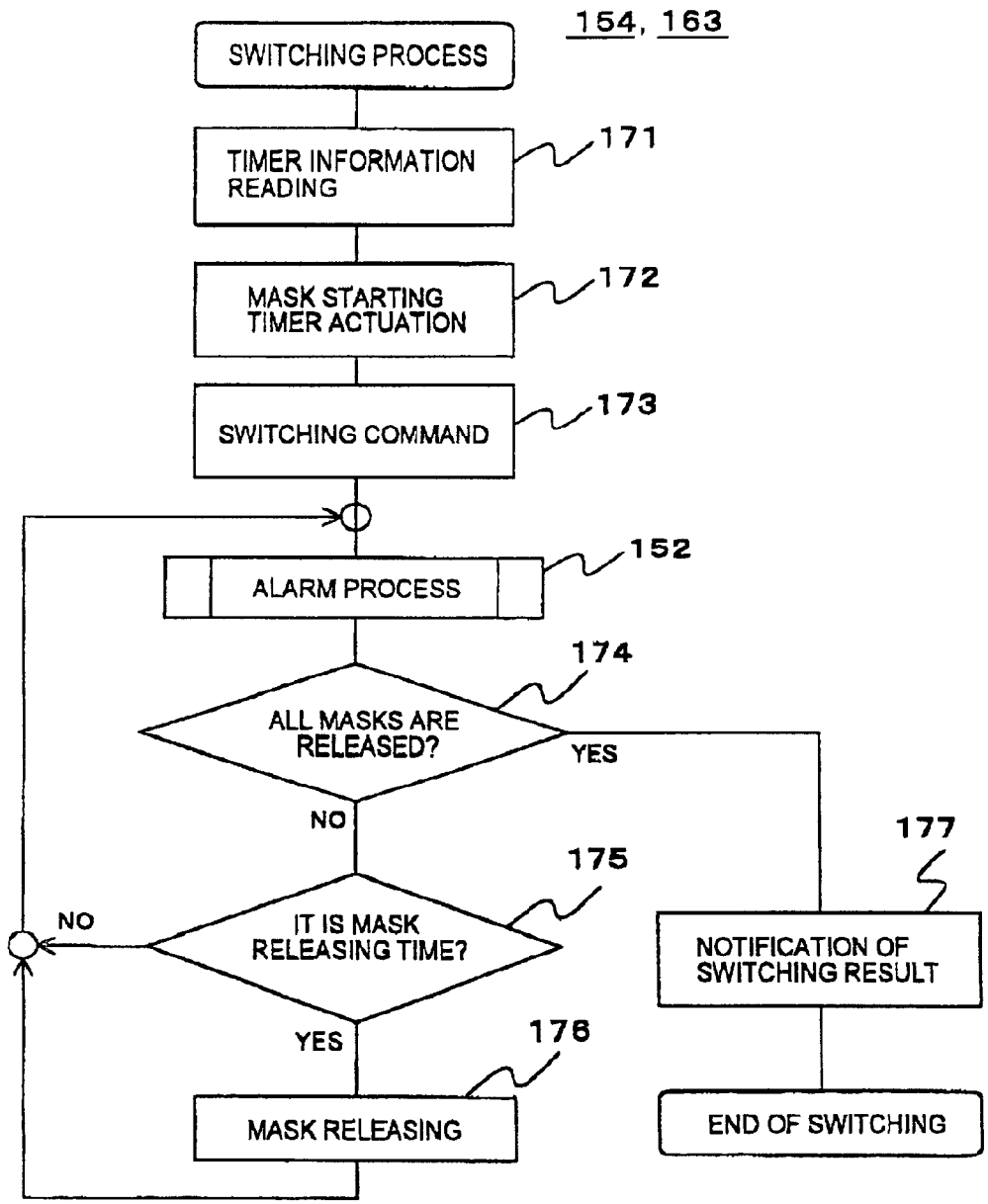
FIG. 17 is a flowchart showing an operation of the CPU 342 of the optical route setting apparatus 100 of FIG. 14.

In the optical route setting apparatus 100 shown in FIG. 7, the alarm mask 303 is constructed in such a manner that, by using the alarm register 352 and the mask register 353, the alarm issuing unit 351 obtains a logical product of bits ("1" or "0") stored in the corresponding areas of both registers, and then issues an alarm. However, by using the CPU 342 to execute a program, alarm processing setting an alarm mask can be executed. This processing is now described by referring to FIGS. 14 to 17. In this case, as shown in FIG. 14, the optical route setting apparatus 100 includes no constituent element of alarm masks 303. In the alarm management memory 344, in addition to the masking period of each alarm of FIG. 9, programs as shown in FIGS. 15 to 17 are prestored. The CPU 342 performs alarm processing and switching of the optical switch 300 by reading and executing the programs of the alarm management memory 344. The CPU 342 initializes the programs upon reading in step 151 of FIG. 15, inputs a loop, and executes alarm processing (step 152) unless there is a route switching request (step 153) from the unillustrated supervisory and control system (OpS) or resetting (step 155). The alarm processing is finished without any changes if the CPU 342 has received no alarms from the alarm interface circuit 353 (step 161) as shown in FIG. 16. If the CPU 342 has received an alarm, the CPU 342 itself determines a necessity of processing for recovery from a trouble. If the processing for recovery is necessary, then the CPU 342 performs an operation for switching the optical switch 300 to a predetermined route (steps 162 and 163). When necessary, for example when a trouble cannot be solved by a switching operation in the self optical route setting apparatus 100, notification (steps 164 and 165) is made to the not-shown supervisory and control system (OpS), and the process is finished. In this case, the process proceeds to step 153 of FIG. 15, a proper switching request is received from the not-shown supervisory and control system (OpS), and a switching operation is carried out (step 154).

In a case where a route switching request is received from the external apparatus, the switching operation (step 154) or the switching operation for recovery (step 163) is carried out in a manner shown in FIG. 17. First, the CPU 342 reads a masking period of each alarm from the alarm management memory 344 for each output port, starts masking, and actuates the timer 346. In this case, a configuration can be made in such a manner that an area is previously provided in the alarm management memory 344 to write-in presetting of an alarm mask for each output port, and the CPU 342 sets a mask for each writing of "0" or "1" in this area. In a mask set state, a switching command is outputted to the optical switch 300 (step 173). Accordingly, the optical switch 300 executes route switching. The CPU 342 proceeds to step 152, and executes a flow of alarm processing 152 shown in FIG. 16. However, if the CPU 342 receives an alarm from the alarm interface circuit 353 in step 161, during the alarm masking period of the port in step 172, processing is executed determining that there are no alarms. The CPU 342 receives mask releasing time information from the timer, and releases a specified mask when the mask releasing time is reached (steps 175 and 176). For example, the mask is released by writing "1" indicating mask releasing in the alarm mask writing area of the alarm management memory. Regarding the alarm of the mask-released port, if the CPU 342 receives an alarm from the alarm interface circuit 353 in the alarm processing of step 152, the process proceeds to step 162 in the flow of FIG. 16, and recovery is made when necessary. When the masking time of a last alarm mask reaches a releasing time (step 175), alarm processing is executed (step 152), all the masks are released (step 174), and a result of the switching is written in the switching information memory 343 (step 177). Thus, the switching operation of the optical routes is finished As described above, according to the configuration of FIGS. 14 to 17, since the alarm mask can be realized by software, the optical route switching apparatus 100 of the embodiment can be provided with a simple configuration of the apparatus. In addition, the programs of FIGS. 15 to 17 are stored in the memory 344 of the control unit 305 of the existing optical route switching apparatus, and the CPU 342 executes these programs. Thus, the existing optical route switching apparatus can be used to achieve the operation of the optical route switching apparatus 100 of the embodiment.

According to the embodiment, there are four factors to be detected, i.e., the optical signal power failure, the error rate deterioration, the operation clock stepping-out, and the frame stepping-out. However, factors are not limited to these, and the number of factors can be reduced/increased as occasion demands. In any case, for each of the factors, a proper masking period is preset.

Description has been made for the case where the optical route switching apparatus 100 of the embodiment uses, as the optical switch 300, the mechanical optical switch causing an optical power failure during the switching operation. However, the optical route switching apparatus 100 of the embodiment can use an optical switch causing no optical power failures during switching. For example, an optical switch based on an electrooptical effect and a thermooptical effect can be used. In such an optical switch, no optical power failures occur during a switching operation, but operation clock stepping-out and frame stepping-out occur similarly to the embodiment. Thus, at least an operation clock stepping-out alarm and a frame stepping-out alarm are monitored as alarm factors, and masking for predetermined periods is applied during the switching operation of the optical switch, thus it is made possible to prevent the operation clock stepping-out and the frame stepping-out by the normal switching operation of the optical switch from being erroneously recognized as occurrences of troubles. Therefore, there is no possibility of starting a new route switching operation or the like for recovery from a trouble despite the normal switching operation, thus making it possible to provide a highly reliable optical route setting apparatus. Moreover, a masking period is set properly for each alarm, then detection accuracy for an occurrence of a real trouble is not reduced, thus it is made possible to provide a highly reliable route switching apparatus.

As described above, according to the present invention, it is possible to provide a highly reliable optical communication network system for performing route switching of an optical signal without any changes of the optical signal, which is capable of preventing notification of an erroneous alarm during a switching operation of an optical switch.

What is claimed is:

1. An optical switching apparatus comprising:
an optical switch for switching and setting routes of an optical signal without being converted;
a control unit for instructing said optical switch to execute an operation of switching said routes;
a performance monitor for detecting performance of the optical signal having a route set by the optical switch, and issuing an alarm; and
an alarm masking unit for receiving said alarm from said performance monitor, and passing said alarm to said control unit,
wherein said performance monitor issues said alarm when said performance detected is deteriorated from predetermined performance, and
said alarm masking unit masks said alarm issued from said performance monitor for a predetermined masking period from a starting time of said operation of switching by said optical switch, and interrupts an input of said alarm to said control unit.

2. The optical switching apparatus according to claim 1, wherein said performance monitor detects said performance of said optical signal for a plurality of predetermined factors, and outputs the alarm for each of said plurality of factors,
said masking period of said alarm masking unit is decided for each of said plurality of factors of said performance monitor, and said alarm is masked for each of the plurality of factors.

3. The optical switching apparatus according to claim 1, wherein said plurality of factors include at least one of optical power, operation clock synchronization, frame clock synchronization, and an error rate of said optical signal.

4. The optical switching apparatus according to claim 2, wherein said optical switch includes output routes amounting to N in number,
said performance monitor is disposed for each of the number N of output routes, said alarm is issued for said optical signal of each of said number N of output routes regarding each of said plurality of factors, and
said alarm masking unit masks said alarm for each of said plurality of factors for each of said number N of output routes.

5. The optical switching apparatus according to claim 4, wherein said alarm masking unit includes a mask register, an alarm register and an alarm issuing unit,
said mask register and said alarm register have bit areas respectively corresponding to said plurality of factors for each of said number N of output routes,
in said bit area of said mask register, for each of said factors of said corresponding output route, a bit indicating "MASKED STATE" is written during said masking period, and a bit indicating "MASKING RELEASED" is written when said masking is in a released state,
in said bit area of said alarm register, for each of said factors of said corresponding output route, a bit indicating "THERE IS ALARM" is written when said alarm is issued from said performance monitor, and a bit indicating "NO ALARM" is written when no alarms are issued, and
said alarm issuing unit issues said alarm to said control unlit when said bits respectively indicating "MASK RELEASED" and "THERE IS ALARM" are written in said corresponding bit areas of said mask register and said alarm register.

6. An optical switch control apparatus for instructing an optical switch for switching and setting routes of an optical signal without being converted to execute a route switching operation, comprising:

an alarm receiver for receiving an alarm issued from an external performance monitor for detecting performance of said optical signal having said route set by said optical switch; and an alarm masking unit for masking said alarm received by said alarm receiver for a predetermined masking period from a starting time of said switching operation of said optical switch.

7. The optical switch control apparatus according to claim 6, wherein said external performance monitor detects said performance of said optical signal for a plurality of predetermined factors and issues said alarm for each of said plurality of factors, said masking period of said alarm masking unit is decided for each of said plurality of factors of said external performance monitor, and said alarm is masked for each of said plurality of factors.

8. An optical switching apparatus comprising:

an optical switch for switching and setting routes of an optical signal without being converted; and an alarm masking unit for masking an alarm issued from an external, performance monitor for detecting performance of said optical signal having said route set by said optical switch, wherein said alarm masking unit includes an alarm receiver for receiving said alarm issued from said external performance monitor, and masks said alarm received by said alarm receiver for a predetermined masking period from a starting time of a switching operation of said optical switch.

9. The optical switching apparatus according to claim 8, wherein said external performance monitor detects said performance of said optical signal for a plurality of predetermined factors and issues said alarm for each of said plurality of factors, said masking period of said alarm masking unit is decided for each of said plurality of factors of said external performance monitor, and said alarm is masked for each of said plurality of factors.

10. An optical communication network system comprising:

an optical switching apparatus, wherein said optical switching apparatus includes an optical switch for switching and setting routes of an optical signal without being converted, a control unit for instructing said optical switch to execute an operation of switching said routes, a performance monitor for detecting performance of the optical signal having said route set by the optical switch, and issuing an alarm, and an alarm masking unit for receiving said alarm from said performance monitor, and passing said alarm to said control unit;

said performance monitor issues said alarm when said performance detected is deteriorated from predetermined performance, and said alarm masking unit masks said alarm issued from said performance monitor for a predetermined masking period from a starting time of said operation of switching by said optical switch and interrupts an input of said alarm to said control unit.

11. The optical communication network system according to claim 10, wherein said performance monitor detects said performance of said optical signal for a plurality of predetermined factors, and outputs said alarm for each of said plurality of factors, said masking period of said alarm masking unit is decided for each of said plurality of factors of said performance monitor, and said alarm is masked for each of said plurality of factors.

12. An optical switching apparatus comprising:

a control unit;

an optical switch for setting routes of an optical signal; and a performance monitor for detecting performance deterioration of said optical signal having be set a route by said optical switch, and issuing an alarm, wherein said control unit includes means for controlling route setting of said optical switch, and means for distinguishing the alarm between (1) one caused by a trouble, and (2) one caused by the route setting operation of said optical switch and controlling issuance of said alarm to the other connected apparatus.

* * * * *